United States Patent
Lindsay

[15] 3,696,672
[45] Oct. 10, 1972

[54] WIND SOCK

[72] Inventor: John Lindsay, 16 Harbor Street, Manchester, Mass. 01944

[22] Filed: Sept. 15, 1970

[21] Appl. No.: 72,409

[52] U.S. Cl. ............................................... 73/189
[51] Int. Cl. ............................................. G01w 1/02
[58] Field of Search ...................................... 73/189

[56] References Cited

UNITED STATES PATENTS 2,617,298  11/1952  Grinley ...................... 73/189
2,870,383   1/1959  Mazzarella .............. 73/189 X

FOREIGN PATENTS OR APPLICATIONS 646,013  7/1928  France ........................ 73/189

Primary Examiner—Richard C. Queisser
Assistant Examiner—John P. Beauchamp
Attorney—Robert R. Churchill

[57] ABSTRACT

An instrument for determining the direction and speed of the wind commonly referred to as a "wind sock" which is mounted to rotate through a horizontal plane to indicate the wind direction and is characterized by having provision for also rotating on its own axis to indicate the force or speed of the wind. The wind sock can also be mounted to pivot in a vertical plane in response to the force of the wind.

14 Claims, 6 Drawing Figures

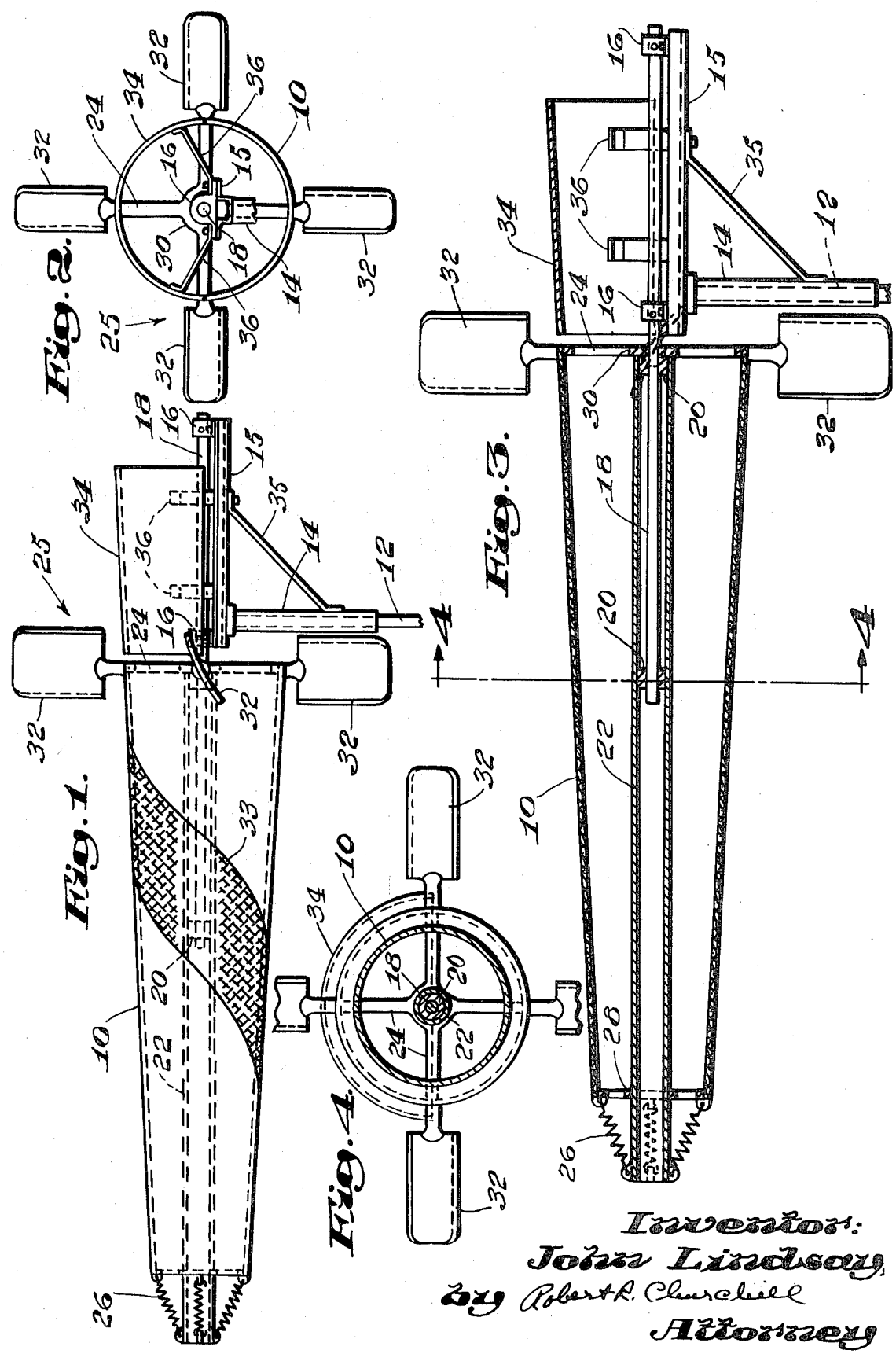

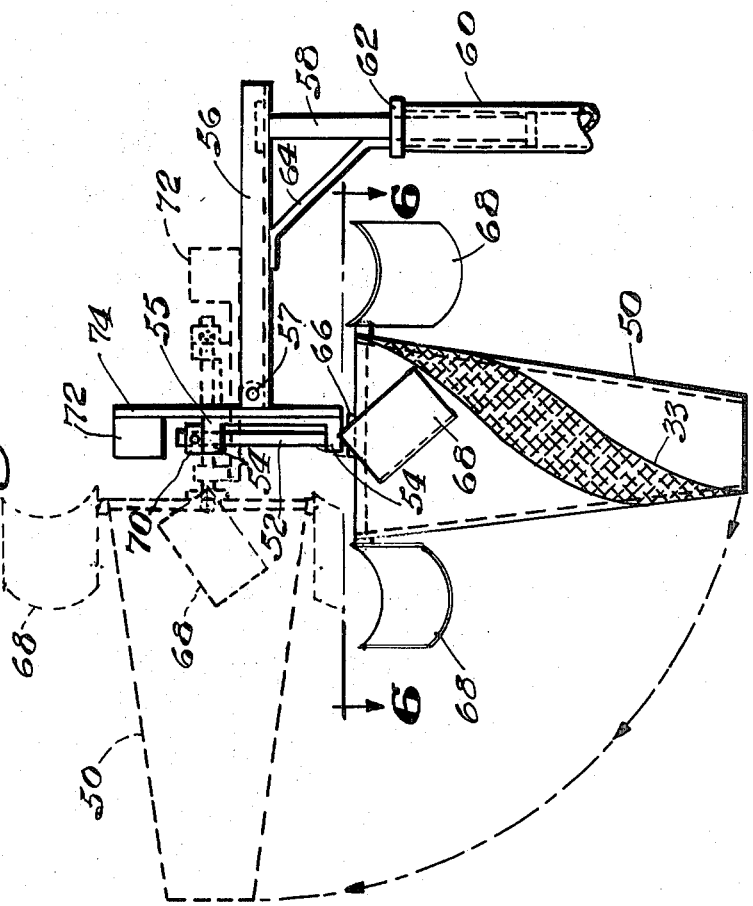
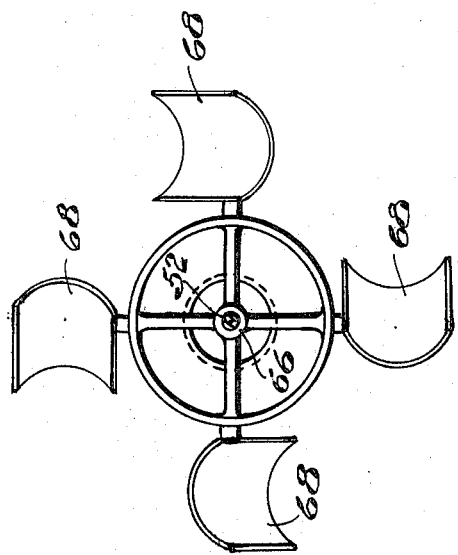

WIND SOCK

This invention relates to an instrument for determining the direction and speed of the wind commonly referred to as a "wind sock."

The invention has for an object to provide a novel and improved wind sock which is characterized by structure for indicating not only the direction but also the force or speed of the wind in a novel and superior manner.

With this general object in view and such others as may hereinafter appear, the invention consists in the wind sock as hereinafter described and particularly defined in the claims at the end of this specification.

In the drawings illustrating the preferred embodiment of the invention:

FIG. 1 is a side elevation of one form of wind sock embodying the present invention;

FIG. 2 is an end view of the wind sock shown in FIG. 1;

FIG. 3 is a longitudinal cross sectional view of the wind sock shown in FIG. 1;

FIG. 4 is a view in cross section as seen from the line 4—4 of FIG. 3;

FIG. 5 is a side elevation of another preferred form of wind sock embodying the present invention; and FIG. 6 is a view in cross section as seen from the line 6—6 of FIG. 5.

In general, the present invention contemplates a novel and improved wind sock or wind sleeve which is made of a flexible material, such as Dacron sail cloth, or the like, similar to the conventional truncated cloth cone open at both ends for indicating the direction of the wind. In one embodiment of the invention, the wind sock extends horizontally and is supported at one end on a vertical rod for pivotal movement in a horizontal plane to indicate the direction of the wind. In another embodiment of the invention, the wind sock is suspended vertically from a pivotal support when there is little or no wind and is further provided with a counterweight to cause it to assume a horizontal or intermediate position in accordance with the force of the wind. In this latter embodiment, the unit is also mounted to pivot about a vertical rod through 360° to show the direction of the wind. In both embodiments of the invention, provisions is made for rotating the sock on its own axis whereby to indicate the force or speed of the wind.

Referring now to the drawings, the embodiment of the invention shown in FIGS. 1–4 comprises a truncated cone 10 open at both ends and is made of a lightweight flexible material, such as Dacron sail cloth. In accordance with the present invention, the cone is mounted to rotate in a horizontal plane and also to rotate on its own axis. As herein shown, a vertical rod 12 suitably supported at its lower end carries a bracket 14 mounted to rotate on the upper end of the rod. The bracket 14 is provided with a horizontal leg 15 extending in a direction opposite to the cone, the horizontal leg having bearing members 16 in which a stationary shaft 18 is supported. The shaft 18 extends within the cone 10 to a point intermediate the ends thereof and is provided with bearing elements or collars 20. The collars support for rotation thereon a central tubular member 22. The inner end of the tubular member is connected to a hub 30 from which extends the radial arms 24 of a windmill indicated generally at 25. The larger end of the cone 10 is connected to a rim portion formed integrally with the radial arms 24. The outer end of the tubular member 22 extends a short distance beyond the smaller end of the truncated cone 10, and the latter is connected to the end of the tubular member 22 by springs 26 in order to maintain the flexible material of the cone in a relatively taut condition. The small end of the cone is further provided with an open end wall 28 having a hub and a rim portion connected by radial arms and which is arranged to support the small end of the cone concentrically with the tubular member. The springs 26 serve to maintain the cone in a radially extended position as limited by the hub 30 of the radial arms 24 bearing against the adjacent stationary collar 20. The outer end of each radial arm 24 is provided with a tilted vane 32 which is slightly curved in cross section to complete the windmill 25 as shown. In order to prevent snow or rain from entering the large end of the cone, a protective hood 34 is provided. The hood is semicircular in cross section to conform to the taper of the wind sock. The hood 34 is open at both ends and is attached to the horizontal leg 15 of the bracket 14 by arms 36 extended between the cover and the bracket. The leg 15 is connected to the upright leg of the bracket 14 by a strut 35.

With this construction, it will be seen that in operation the wind striking the side of the sock will rotate the same on its supporting rod 12 until it reaches a point parallel with the wind whereupon the wind will enter the large end of the cone and leave the small end thereof to maintain the sock in a stable condition to indicate the direction of the wind. Furthermore, when the wind strikes the tilted and slightly curved vanes 32 of the windmill, the cone will be rotated on its own axis to indicate in a general way the speed of the wind. As illustrated, the cone is provided with a relatively wide spiral stripe or band 33 thereon which is of a contrasting color with relation to the remainder of the cone so that it will be easy to detect the rotation of the cone from a long distance away. The markings on the stripe shown in the drawings indicates an orange color.

Referring now to FIGS. 5 and 6, in a modified form of the invention, the cone 50 is carried by the end of a shaft 52 which is mounted for rotation in bearings 54 formed in a bracket or frame member 55 pivotally carried by a pin 57 disposed at one end of a horizontal bar 56. The other end of the bar 56 is connected to the upper end of a vertical shaft 58 which is mounted for rotation in a tubular supporting column 60. A collar 62 fast on the shaft 58 rests on the upper end of the tubular column 60 and a strut 64 extends from the bar 56 to the shaft 58.

In this embodiment of the invention, the truncated cone 50 is also made of a flexible material and is open at both ends, the larger end being connected to the shaft by a hub portion 66 having radially extended arms which are attached to the cone. Extensions of the arms beyond the outside diameter of the cone carry elongated semicircular vanes 68 fast thereon and mounted at an angle of 45° relative to the plane of the large end of the cone. As illustrated in full lines in FIG. 5, the flexible cone 50 normally hangs in a vertical position when there is no wind in the manner of a conventional truncated cloth cone, the outer end of shaft 52 being provided with a collar 70 for engagement with the bracket 55 as shown. In order to facilitate rocking of the cone one its pivot pin 57, a counterweight 72 is carried by an extension 74 attached to the bracket 55. It will be noted that the flexible cone or wind sock 50 shown in FIG. 5 is supported at its larger end only, the smaller end being unsupported and subject to the variations of the wind in the manner of a conventional wind sock.

With this construction it will be seen that in the operation of the modified form of the invention shown in FIGS. 5 and 6, the entire unit will be swung around with the wind on its pivot shaft 58, and that the sock 50 will then pivot on the pin 57 to extend in an angular or a horizontal position, as shown in dotted lines, in accordance with the direction and the force of the wind, and also in accordance with the effect of the counterweight. Likewise, the vanes 68 will effect rotation of the cone on its own axis to indicate the speed of the wind as well as the direction thereof. It will be observed that the semicircular vanes 68 are adapted to be moved by the wind so as to effect rotation of the sock in any position of operation from a vertical position to a horizontal position.

While the cone has been defined herein as comprising a flexible cloth material, it will be understood that the cone may comprise other materials, including rigid or semirigid materials, such as thin gauge metal or lightweight plastic material with equal advantage.

Having thus described the invention, what is claimed is:

1. An instrument for determining the direction and speed of the wind comprising a truncated cone open at both ends, and means for mounting the cone for rotation about its longitudinal axis, and a second mounting means for supporting the first mounting means for rotation about a vertical axis, means carried by the cone responsive to the wind for rotating the cone.

2. An instrument as defined in claim 1 wherein the cone is provided with vanes extended radially therefrom to effect rotation of the cone by the wind.

3. An instrument as defined in claim 1 wherein the cone is provided with a spiral band of a contrasting color from the remainder of the cone.

4. An instrument as defined in claim 1 wherein the cone is extended horizontally and is moved by the wind to assume a position parallel thereto.

5. An instrument as defined in claim 1 wherein the first means comprises an arm mounted on said second mounting means whereby the cone can pivot in a vertical plane and said arm is further provided at its free end with a counterweight to assume different angular positions between the vertical and the horizontal in accordance with the speed of the wind.

6. An instrument as defined in claim 5 wherein the cone is provided with vanes adapted to effect rotation of the cone by the wind when disposed in any of said angular positions.

7. A wind sock for determining the direction and speed of the wind comprising a truncated cone open at both ends, said cone being extended horizontally and mounted for rotation about a vertical rod to indicate the direction of the wind, said mounting including a bracket mounted to rotate on said rod, a horizontally extended shaft carried by said bracket and on which said cone is rotatably mounted, said cone having vanes arranged to effect rotation of the cone on its own axis to indicate the speed of the wind.

8. A wind sock as defined in claim 7 wherein a cover carried by said bracket is provided to prevent entrance of snow or rain into the cone.

9. A wind sock as defined in claim 7 wherein the cone comprises a flexible material.

10. A wind sock as defined in claim 7 wherein the cone comprises a rigid material.

11. A wind sock for determining the direction and speed of the wind comprising a truncated cone open at both ends, a bracket, a shaft carried by said bracket, bearing means for rotatably supporting said cone on said shaft for rotation of said cone about its own axis, said bracket being pivotally carried by a horizontally extended frame member which is itself mounted to rotate on a vertical rod, said cone having vanes extended radially therefrom and provided with a counterweight, said cone being movable to different positions from a vertical to a horizontal plane; rotatable about said vertical rod to indicate the direction of the wind; and rotatable on its own axis to indicate the speed of the wind.

12. A wind sock as defined in claim 11 wherein the vanes are adapted to rotate the cone at any of said different positions.

13. A wind sock as defined in claim 11 wherein the cone comprises a flexible material.

14. A wind sock as defined in claim 11 wherein the cone comprises a rigid material.

* * * * *